May 5, 1931.  W. M. CHARMAN  1,804,208
HOT TOP
Filed March 29, 1930  2 Sheets-Sheet 1
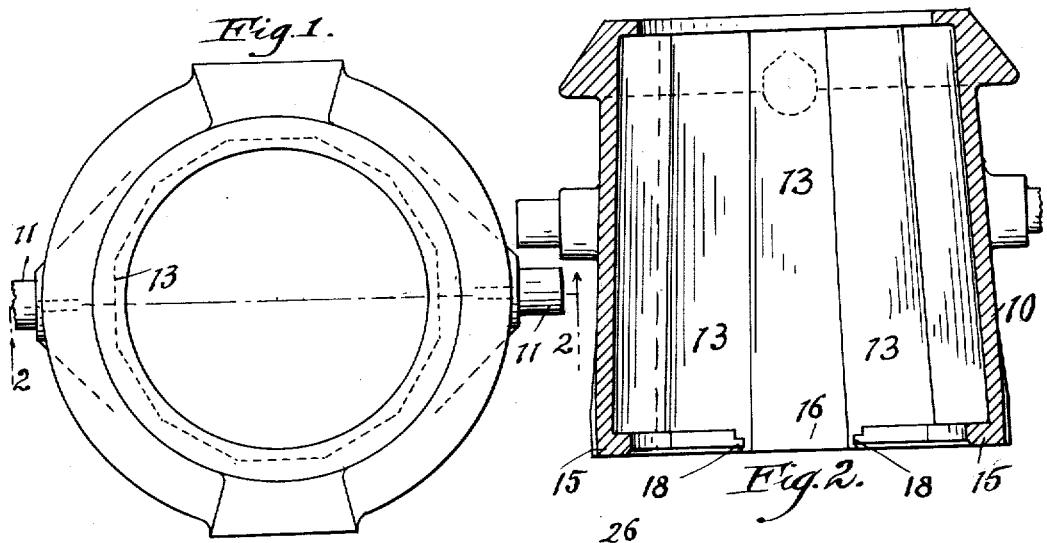
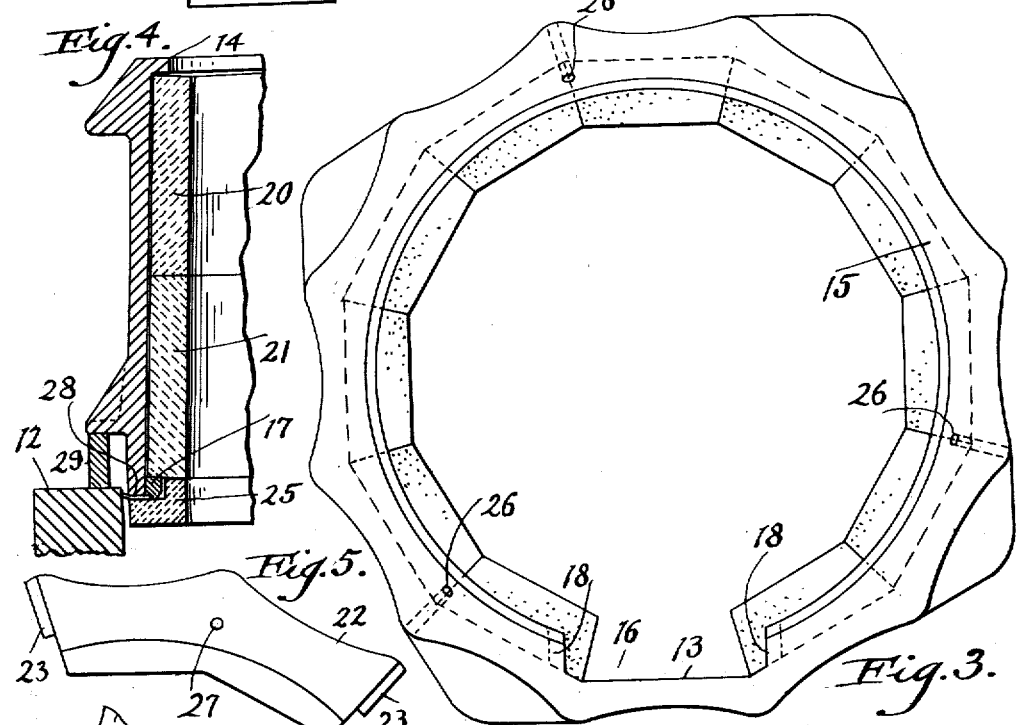
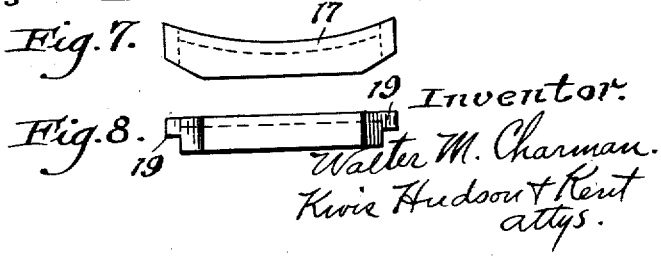

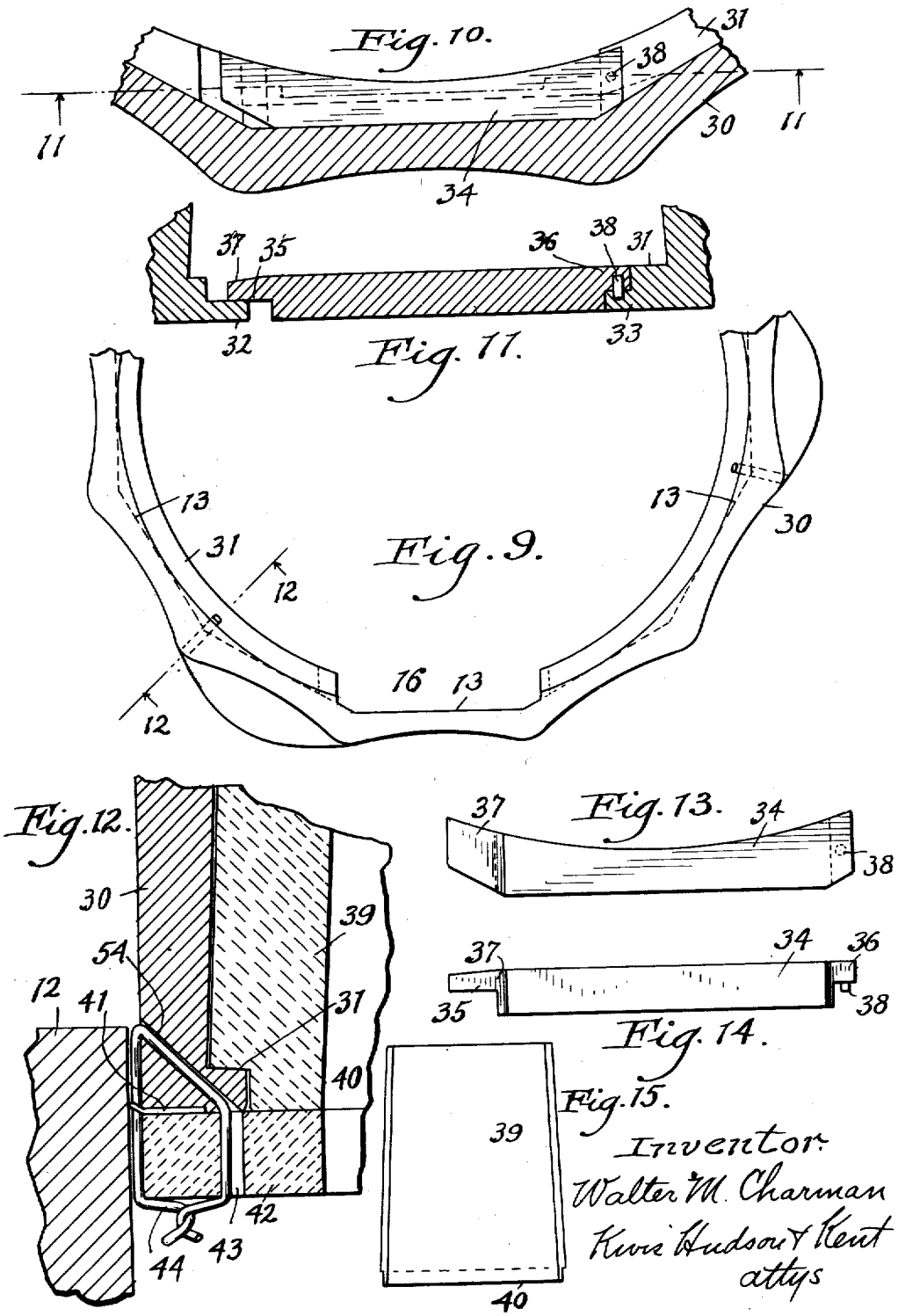

Patented May 5, 1931

1,804,208

UNITED STATES PATENT OFFICE

WALTER M. CHARMAN, OF YOUNGSTOWN, OHIO

HOT TOP

Application filed March 29, 1930. Serial No. 440,127.

This invention relates to hot tops for use in connection with ingot molds, and especially to that type of hot top which comprises a metallic casing and a lining of refractory material made up in blocks or bricks fitted to the inner wall of the casing, there being also preferably a temporary bottom lining course detachably connected to the casing for the protection of the lower edge thereof, this bottom course being left behind upon the ingot when the hot top is stripped therefrom and being renewable for the next pouring. In some respects the present application is an improvement over prior application, Serial No. 329,486, filed December 31, 1928, by Harry J. Darlington and Walter M. Charman jointly and over prior application, Serial No. 415,646, filed by me on December 21, 1929.

One of the objects of the invention is the provision in connection with an upwardly tapered casing having an inner bottom ledge, of a removable ledge section which, when removed, affords an opening through which the last lining block may be inserted.

Another object is the provision of a metal casing having an inner bottom ledge, a semipermanent lining having a depending lip covering the inner edge of the ledge, and a flat bottom course lining of simple form temporarily attached to the casing.

A further object is the provision of a structure of this kind in which the hot top cost per ingot shall be reduced to a minimum.

Other objects and features of novelty will appear as I proceed with a description of those embodiments of the invention which, for the purposes of the present application, I have illustrated in the accompanying drawings in which, Figure 1 is a top plan view of a hot top embodying the invention.

Fig. 2 is a vertical sectional view taken substantially on the line 2—2 of Fig. 1.

Fig. 3 is a bottom plan view on a larger scale, showing the casing with all of the semipermanent lining blocks in place except the last one.

Fig. 4 is a fragmental vertical sectional view showing the hot top in pouring position on a mold, the section being taken through the removable portion of the ledge.

Figs. 5 and 6 are top plan views of alternate lining blocks of the temporary bottom course.

Figs. 7 and 8 are top plan and side elevational views respectively of the removable ledge section.

Fig. 9 is a bottom plan view of a casing having a somewhat different form of removable ledge section.

Fig. 10 is a fragmental horizontal sectional view on a larger scale, showing the removable section in plan.

Fig. 11 is a vertical section taken on line 11—11 of Fig. 10.

Fig. 12 is a fragmental vertical sectional view of the hot top in position upon a mold, the view being taken substantially on the line 12—12 of Fig. 9.

Figs. 13 and 14 are plan and side elevational views respectively of the removable ledge section illustrated in Figs. 10 and 11, and Fig. 15 is a front elevational view of one of the semi-permanent lining blocks.

In the drawings I have illustrated a hot top casing 10 of metal, made in one or more parts as may be convenient, and provided with trunnions 11 for convenience in handling. The hot top is designed to enter the top of the mold, the latter being indicated at 12 in Figs. 4 and 12. In the present instance the hot top is externally fluted in order to correspond with a similarly fluted inner surface of the mold, but it should be understood that the particular contour of the casing outer wall is merely a matter of design, being governed by the shape of the mold. The inner wall of the casing is tapered upwardly, and in the present instance is divided into twelve equal flat surfaces 13 extending from top to bottom. A greater or lesser number of flats might of course be employed, or the inner wall might be formed with any suitable surface, for example a continuous curved surface if desired. At the top of the casing there is preferably an inwardly extending rim 14 against which the lining blocks may engage. A small clearance is usually left between the upper flange of the casting and the inner lining brick so that the inner locking lower segment may be readily placed in position. After the lining elements are all in place and the hot top again turned right side up, the upper lining brick are forced down tightly against the lower ledge and the clearance between the upper lining brick and the upper flange is filled with some high temperature cement or other suitable material. However as the blocks are beveled and tapered, and therefore lock themselves together when all of them are in place, the rim 14 may be omitted if desired.

At the bottom of the casing I provide an inwardly extending ledge 15 which is continuous except that it is interrupted across one of the flats 13 and for a short distance on either side thereof, as indicated at 16. The adjacent ends of the ledge 15 are formed as parallel guides upon which a removable ledge section 17 may be slid into place to form a complete ledge. For this purpose I prefer to recess the ends of the fixed ledge on their upper sides leaving lips 18. The removable ledge section 17 is formed with complementary lips 19 which slide upon the lips 18 when the removable section is moved into or out of operative position.

The semi-permanent part of the refractory lining is made preferably in two courses, the upper course comprising blocks 20 and the lower course blocks 21. All of the blocks 20 are the same, being tapered slightly toward the top and provided with side bevels formed along planes radial to the vertical axis of the casing. The blocks 21 are likewise all alike and similarly tapered and beveled. However it will be understood that where molds of rectangular or irregular shapes are employed it will not be convenient or always possible to limit the blocks to two sizes only. In such cases the space 16 will be wide enough to admit the last block put in place and such last block will always be so shaped as to lock the various blocks of the course in place.

A further temporary lining course, which is designed to be left behind on the ingot when the hot top is stripped therefrom, covers the lower end of the casing and the lower edges of the blocks 21, the blocks of this section being of cross sectional shape illustrated in Fig. 4. In this course, every other block 22 is provided with end projections 23, which underlie recesses 24 in the intermediate blocks 25. The blocks 22 are attached to the casing by temporary fastenings that are adapted to fail when the hot top is stripped from the ingot. To this end the casing may be provided with diagonal bores 26 for the reception of the temporary fastenings, and the blocks 22 may have passages 27 extending therethrough, the upper ends of which register approximately with the bores 26 for the same purpose. The fastening may take the form hereinafter referred to in connection with Fig. 12 of the drawing.

In assembling the upper or semi-permanent lining, the hot top casing 10 is inverted while suspended upon its trunnions 11. The blocks 20 are then put in place, the last one being slid downwardly along the wall of the casing into locked position. Then the blocks 21 are put in place one at a time until all but one are in position, the space 16 for this last block being left midway between the ends of the permanent ledge 11. The last block is then slid downwardly through this space along the wall of the casing, thereby locking the blocks of this course in position also. Now the ledge section 17 is slid into place by movement from a position within the casing horizontally outward. Thereafter the metal wiper strip 28 is placed upon the lower edge surface of the casing, the blocks 25 of the temporary lining course are put in place, and finally the blocks 22 of that course. The blocks 22 are then fastened to the casings by the temporary fastening means above referred to, and after having the junction between the upper and lower or temporary bricks sealed tightly with the proper cement or facing material and inner lining slurried with the proper facing compound, the hot top is ready to be turned right side up and used. When placed upon the ingot it is supported in pouring position by means of suitable supports, for example wooden blocks 29 which are knocked out as soon as the metal is poured so that the hot top may sink with the metal as the latter cools and shrinks.

Referring now to that form of the invention which is illustrated in Figs. 9 to 15 inclusive of the drawings, the casing 30 is illustrated as of a shape identical with that of the first described form of the invention, except as to the ends of the fixed ledge 31. One end of this ledge is recessed to leave a lip 32 which may be apprixomately twice as long as the lip 33 on the opposite end of the ledge. The removable ledge 34 is provided with complementary lips 35 and 36, the lip 35 being beveled off slightly as indicated at 37, and the lip 36 having a depending pin 38 mounted therein which is adapted to take into a socket formed in the upper side of the lip 33 for this purpose.

This removable ledge section may be employed where the blocks 39 of the lower course of semi-permanent lining are provided with lips 40 which overhang the ledge, thereby making it impossible to slide the removable ledge section into place horizontally as in the case of the first described form of the invention. The casing being inverted, and all of the semi-permanent lining blocks being in place, the last one having been inserted through the space 16, the operator slips the lip 35 of the removable ledge section into the space between the lining and the lip 32 on the fixed ledge, moving the section 34 endwise for this purpose. The bevel 37 permits this action. When the lip 35 has been forced inward as far as it will go the lip 36 is enabled to move downward past the lip 33, and the ledge section 34 may then be slid toward the right in Figs. 10 and 11 until the pin 38 finds its socket. Sufficient clearance must be provided to permit the short projecting end of the pin 38 to ride over the top surface of lip 33. This may be accomplished by leaving a small clearance between the upper flange of the casting and the inner lining brick, so that the whole inner lining may be pushed toward the upper flange a sufficient distance to permit the insertion of the lower segment while the hot top is in an upside down position. From the above it is obvious that the inner lining may then be pushed down tightly against the lower ledge and inserted segment, thus holding the latter firmly in its proper position.

The lower edges of the blocks 39 are flush with the bottom edge of the casing 30, the latter having a shallow recess for the wiper strip 41. This strip and the lower edge of the casing as well as the lower ends of the blocks 39 are covered by the lining blocks 42 of the bottom course. These blocks are of simple rectangular form in cross section, as indicated in Fig. 12, and have holes 43 therethrough registering approximately with the lower ends of diagonal holes 54 in the casing. Every other one of the blocks 42 is secured to the casing by means of a wire 44 which is threaded through the holes 43 and 54, bent downwardly over the outer side of the casing, and the ends twisted together. The intermediate blocks are supported by interconnecting end portions similar to those illustrated in Figs. 5 and 6. It will, of course, be apparent that such interconnecting end portions may be omitted if all of the blocks of the lower course are wired in place.

While in the foregoing description and accompanying drawings I have disclosed more or less in detail certain specific embodiments of the invention, I desire it to be understood that such detail disclosure has been resorted to primarily for the purpose of fully illustrating the invention in compliance with the requirements of the statute, and that it is not to be construed as amounting to a limitation upon the scope thereof.

Having thus described my invention, I claim:

1. In a hot top, a metallic casing having an inner surface tapered toward the top thereof, and having an inwardly directed ledge at the bottom thereof, said ledge being provided with a removable section, and a lining comprising tapered blocks, one of said blocks having a maximum width less than the length of the lining removable section.

2. In a hot top, a metallic casing having an inner surface tapered toward the top thereof, and having an inwardly directed ledge at the bottom thereof, said ledge being provided with a removable section, and a lining comprising blocks tapered upwardly with their side edges beveled inwardly, one of the lining blocks being of a maximum width less than the length of said removable section.

3. In a hot top, a metallic casing having a retaining ledge extending inwardly from the upper edge thereof, and a lining comprising a plurality of blocks with edge surfaces engaging so as to prevent inward movement of the blocks, said casing having an inner ledge at the bottom thereof, one of said ledges being provided with a removable section of a length greater than the maximum width of one of said blocks, whereby the last block may be inserted lengthwise through the space left by said removable section.

4. In a hot top, a metallic casing having an inner surface tapered toward the top thereof, and having an inwardly directed ledge at the bottom thereof, said ledge being provided with a removable section, and a lining comprising a plurality of identical tapered sections beveled along their side edges, the maximum width of the individual blocks being less than the length of said removable section.

5. In a hot top, a metallic casing having an inner surface tapered toward the top thereof and having an inner ledge at the bottom thereof, said ledge being provided with a removable section, interengaging lips on the fixed portion of the ledge and upon the removable section, whereby the removable section may be supported in place, and a lining comprising tapered blocks adapted collectively to fit the inner surface of the casing and completely cover the same, the maximum width of one of said blocks being less than the length of said removable section.

6. In a hot top, a metallic casing having an inner surface tapered toward the top thereof and having an inner ledge at the bottom thereof, said ledge being provided with a removable section, a plurality of lining blocks adapted collectively to fit said inner surface and completely cover the same, the lateral edges of adjacent blocks having complete meeting surfaces, one of said blocks being tapered and having beveled side edges, the maximum width of said last mentioned block being less than the length of said removable section.

7. In a hot top, a casing tapered upwardly and having an internal ledge at the lower end thereof, a lining comprising blocks with beveled side edges fitted together to cover the inner wall of the casing and to prevent displacement of the lining blocks inwardly, the blocks of said lining adjacent the ledge having depending lips overhanging the ledge, said ledge being provided with a removable section of a length greater than the maximum width of one of said beveled blocks, said removable section being adapted to be inserted from the bottom of the hot top, a temporary lining covering the lower surface of said ledge including the removable section, and means for releasably attaching said last named lining to said casing, said attaching means being adapted to fail when the hot top is stripped from the ingot.

8. In a hot top, a metallic casing, upper and lower inwardly extending retaining ledges on said casing, a lining for the inner surface of the casing between said ledges, comprising a plurality of blocks with edge surfaces engaging to prevent inward movement of the blocks, the vertical dimension of said lining being slightly less than the distance between said ledges, whereby a slight clearance is provided, one of said ledges being provided with a removable section of a length greater than the maximum width of one of said blocks, whereby the last block may be inserted lengthwise through the space left by the removal of said removable section, and a filling material fitted into said clearance and holding said removable section in place.

9. In a hot top, a metallic casing having an inwardly directed ledge at the bottom thereof, said ledge being provided with a removable section, and a lining comprising a plurality of blocks with beveled side edges, one of said blocks having a maximum width less than the length of said removable section.

In testimony whereof, I hereunto affix my signature.

WALTER M. CHARMAN.

said ledge being provided with a removable section of a length greater than the maximum width of one of said beveled blocks, said removable section being adapted to be inserted from the bottom of the hot top, a temporary lining covering the lower surface of said ledge including the removable section, and means for releasably attaching said last named lining to said casing, said attaching means being adapted to fail when the hot top is stripped from the ingot.

8. In a hot top, a metallic casing, upper and lower inwardly extending retaining ledges on said casing, a lining for the inner surface of the casing between said ledges, comprising a plurality of blocks with edge surfaces engaging to prevent inward movement of the blocks, the vertical dimension of said lining being slightly less than the distance between said ledges, whereby a slight clearance is provided, one of said ledges being provided with a removable section of a length greater than the maximum width of one of said blocks, whereby the last block may be inserted lengthwise through the space left by the removal of said removable section, and a filling material fitted into said clearance and holding said removable section in place.

9. In a hot top, a metallic casing having an inwardly directed ledge at the bottom thereof, said ledge being provided with a removable section, and a lining comprising a plurality of blocks with beveled side edges, one of said blocks having a maximum width less than the length of said removable section.

In testimony whereof, I hereunto affix my signature.

WALTER M. CHARMAN.

CERTIFICATE OF CORRECTION.

Patent No. 1,804,208.  Granted May 5, 1931, to

WALTER M. CHARMAN.

It is hereby certified that error appears in the printed specification of the above numbered patent requiring correction as follows: Page 3, line 63, claim 1, for the word "said" read the lining, and line 65, for "the lining" read said; and that the said Letters Patent should be read with these corrections therein that the same may conform to the record of the case in the Patent Office.

Signed and sealed this 7th day of July, A. D. 1931.

(Seal)

M. J. Moore,
Acting Commissioner of Patents.

CERTIFICATE OF CORRECTION.

Patent No. 1,804,208.                                                     Granted May 5, 1931, to

WALTER M. CHARMAN.

It is hereby certified that error appears in the printed specification of the above numbered patent requiring correction as follows: Page 3, line 63, claim 1, for the word "said" read the lining, and line 65, for "the lining" read said; and that the said Letters Patent should be read with these corrections therein that the same may conform to the record of the case in the Patent Office.

Signed and sealed this 7th day of July, A. D. 1931.

(Seal)                                                              M. J. Moore,
                                                                           Acting Commissioner of Patents.